(12) United States Patent
LaPlant et al.

(10) Patent No.: US 12,103,234 B2
(45) Date of Patent: Oct. 1, 2024

(54) SYSTEM AND PROCESS FOR USING A CONDUCTIVE, NON-STICK COATING FOR AUTOMATING TOOL TOUCH-OFF

(71) Applicant: Honeywell Federal Manufacturing & Technologies, LLC, Kansas City, MO (US)

(72) Inventors: Steven Todd LaPlant, Kansas City, MO (US); Matthew Wayne Trimmer, Paola, KS (US); Nicholas Christopher Ogden, Lee's Summit, MO (US); Mark Douglas Smith, Olathe, KS (US); Ruben Arturo Pino, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 158 days.

(21) Appl. No.: 17/381,944

(22) Filed: Jul. 21, 2021

(65) Prior Publication Data

US 2023/0022706 A1    Jan. 26, 2023

(51) Int. Cl.
| | |
|---|---|
| *B29C 64/00* | (2017.01) |
| *B29C 64/245* | (2017.01) |
| *B29C 64/393* | (2017.01) |
| *B33Y 30/00* | (2015.01) |
| *B33Y 50/02* | (2015.01) |
| *C09D 11/037* | (2014.01) |
| *C09D 11/102* | (2014.01) |

(Continued)

(52) U.S. Cl.
CPC .......... *B29C 64/245* (2017.08); *B29C 64/393* (2017.08); *B33Y 30/00* (2014.12); *B33Y 50/02* (2014.12); *C09D 11/037* (2013.01); *C09D 11/102* (2013.01); *C09D 11/52* (2013.01); *B29K 2827/12* (2013.01); *B29K 2907/04* (2013.01); *B29K 2995/0005* (2013.01); *B29K 2995/0098* (2013.01); *H01B 1/24* (2013.01)

(58) Field of Classification Search
CPC .............................. B29C 64/245; B33Y 30/00
See application file for complete search history.

(56) References Cited

U.S. PATENT DOCUMENTS

| | | | |
|---|---|---|---|
| 5,132,143 | A | 7/1992 | Deckard |
| 5,344,729 | A | 9/1994 | Akins et al. |
| 8,326,024 | B2 | 12/2012 | Shkolnik et al. |

(Continued)

FOREIGN PATENT DOCUMENTS

EP    3174690 B1    5/2020

*Primary Examiner* — Nicholas R Krasnow
(74) *Attorney, Agent, or Firm* — Erise IP, P.A.

(57) ABSTRACT

Systems and methods for using a non-stick conductive material to automate tool touch-off in an additive manufacturing process are provided. A substrate comprises a first conductive layer, an intermediate binder layer, and a second non-stick conductive layer. The non-stick conductive layer may comprise perfluoroalkoxy alkanes and carbon nanotubes. An electrical connection may be made between the first conductive layer and the second non-stick conductive layer. When used with an additive manufacturing device, when the nozzle of the device contacts the substrate, a circuit may close resulting in a detectable voltage drop. When the voltage drop is detected, a reference point for the additive manufacturing device may be set.

16 Claims, 4 Drawing Sheets

(51) Int. Cl.
*C09D 11/52* (2014.01)
*H01B 1/24* (2006.01)

(56) References Cited

U.S. PATENT DOCUMENTS

| | | |
|---|---|---|
| 8,879,957 B2 | 11/2014 | Hanson et al. |
| 9,141,015 B2 | 9/2015 | Hanson et al. |
| 9,233,506 B2 | 1/2016 | Leavitt |
| 9,545,675 B2 | 1/2017 | Childers, Jr. et al. |
| 10,082,753 B2 | 9/2018 | Goto et al. |
| 10,457,833 B2 | 10/2019 | Granlund et al. |
| 10,844,211 B2 | 11/2020 | Lee et al. |
| 10,899,081 B2 | 1/2021 | Matsen et al. |
| 2013/0344258 A1 | 12/2013 | Covey |
| 2015/0137426 A1 | 5/2015 | Van Esbroeck et al. |
| 2016/0144567 A1* | 5/2016 | Müller .................. B33Y 10/00 425/375 |
| 2016/0176112 A1 | 6/2016 | Liu |
| 2017/0036403 A1* | 2/2017 | Ruff ....................... B33Y 40/00 |
| 2017/0355139 A1* | 12/2017 | Wolf ..................... B29C 48/802 |
| 2018/0200946 A1 | 7/2018 | Opschoor et al. |
| 2018/0339455 A1* | 11/2018 | Cohen .................... B25J 18/002 |
| 2019/0240896 A1 | 8/2019 | Achten et al. |
| 2019/0248089 A1* | 8/2019 | Busbee .................... A41C 5/00 |
| 2020/0047402 A1* | 2/2020 | De Backer ............ B29C 64/209 |
| 2020/0130266 A1 | 4/2020 | DeSimone et al. |
| 2020/0282659 A1* | 9/2020 | Lan ...................... H05K 3/1241 |

* cited by examiner

SYSTEM AND PROCESS FOR USING A CONDUCTIVE, NON-STICK COATING FOR AUTOMATING TOOL TOUCH-OFF

STATEMENT OF GOVERNMENTAL SUPPORT

This invention was made with government support under DE-NA0002839 awarded by the United States Department of Energy/National Nuclear Security Administration. The government has certain rights in the invention.

BACKGROUND

1. Field

Embodiments of the invention relate to a system and process for automating tool touch-off in an additive manufacturing process using a conductive, non-stick material. More specifically, embodiments of the invention relate to automating tool touch-off for additive manufacturing processes using a conductive, non-stick coating comprising perfluoroalkoxy alkanes (PFA) and carbon nanotubes (CNT).

2. Related Art

In additive manufacturing, a 3D printer builds a part by depositing a print material according to coordinate instructions. Prior to printing the part, a reference point may be defined for the 3D printer. The reference point is generally the top surface of a substrate, and the reference point is often calibrated by touching a nozzle of the 3D printer to the substrate and setting "Z=0" (also referred to as Z-zero) on the 3D printer. Thus, when the 3D printer receives an instruction to move the nozzle to "Z=1.5," the 3D printer knows that "1.5" is relative to the top surface of the substrate.

The process of setting Z-zero is referred to as tool touch-off and may be automated to increase the efficiency of the 3D printing process. When tool touch-off is not automated, an operator may manually lower the nozzle of the 3D printer until the nozzle touches the substrate. At this point, the operator may enter in "Z=0" on a digital read out or other user interface of the 3D printer to set the reference point. Manual tool touch-off can be an inefficient process that runs the risk of crashing the nozzle into the substrate and damaging the nozzle of the 3D printer and/or the substrate. To help avoid impacting the nozzle, a piece of paper may be placed on top of the substrate, and then the nozzle may be lowered until the piece of paper is trapped between the nozzle and the substrate. Once the paper is trapped, Z-zero may be set. The paper method may help prevent damage caused by the nozzle contacting the substrate, but may also cause additional inefficiencies because the operator may have to check if the paper is trapped at each increment of movement of the nozzle downwards. Because the operator may be concerned about damaging the nozzle and/or the substrate, the operator may perform this process relatively slowly. Further concerns relate to variability resulting from different operators performing tool touch-off manually. Manual operation requires the operator to make the decision when the paper is sufficiently trapped. Various operators may make this decision differently which may lead to variations in where Z-zero is set relative to the top of the substrate. As such, it is desirable to automate the tool touch-off process, both to reduce operator variability such that Z-zero is consistently set and to reduce the risk of damage.

Current methods of automating tool touch-off involve using a conductive substrate that closes a circuit between the substrate and the 3D printer when the nozzle touches the 3D printer. When the nozzle and the substrate make a contact, a voltage drop may occur. The 3D printer may be configured to detect the voltage drop and set Z-zero in response. Conductive metals, such as aluminum, are often employed as substrates in additive manufacturing for this reason. However, common print materials (e.g., rubber) used in additive manufacturing tend to adhere to conductive metals. Thus, when a part finishes printing and is removed from the substrate, the part may stick to the substrate and be damaged upon removal. Parts printed by additive manufacturing methods, such as direct ink writing, are often relatively small and may be easily damaged by adhering to the substrate. Removing the printed part may then require extra care, thereby reducing the efficiency of the printing process even if the part is removed without being damaged. This deficiency is often remedied by the application of a release agent to the substrate. For example, a non-stick material, such as perfluoroalkoxy alkanes (PFA), may be applied to the conductive substrate to prevent parts from adhering to the substrate after printing is finished.

However, the use of current release agents brings a new set of problems to automating tool touch-off and 3D printing. In some production environments, the substrate may need to be machined to extremely tight tolerances, such as about ±0.050 mm. As such, repeated applications of a release agent to the substrate may add excess material that raises the substrate above the tolerance range. For example, if each coating of PFA is 0.02 mm thick, after three coatings of PFA, the substrate exceeds the tolerance. Further, many release agents, such as PFA, cannot be machined down to tolerances as low as 0.05 mm. Consequently, once the substrate is outside of its tolerance range, such as due to the excess addition of release agents, it may not be possible to machine the substrate back down to the required tolerances.

Additionally, common release agents are typically applied via aerosol sprays which may lead to health and safety issues for operators. Furthermore, currently used release agents are not conductive. Furthermore, currently used release agents also offer variability due to the manual method of application. This variation can lead to products being damaged during subsequent removal operations. Additionally, the thickness of the manually sprayed on mold release is not controlled, leading to further process variation when multiple operators are performing tool touch-off. Therefore, by applying currently used release agents to the conductive substrate, the ability to automate the tool touch-off is lost because the non-conductive material cannot carry a charge. What is needed is a conductive, non-stick material that can be used to automate the tool touch-off process. Additionally, it is desirable for the conductive, non-stick material to be machinable to tight tolerances (e.g., 50 microns).

SUMMARY

Embodiments of the invention solve the above-described problems by providing systems and methods for automating tool touch-off setting in additive manufacturing processes using a non-stick, conductive coating. By applying the non-stick conductive coating, the tool touch-off may be automated without parts sticking to the substrate and without release agent residue being left on printed parts. Further, the coating may be machined down to tolerances as low as about ±15 microns, making the coating applicable where tight tolerances are required.

A first embodiment is directed to a system for automating tool touch-off in an additive manufacturing process comprising; a substrate comprising: a first layer comprising a first conductive material, a second layer comprising a binding material, and a third layer comprising a second non-stick conductive material, wherein the second non-stick conductive material comprises a fluoropolymer and carbon nanotubes; and a conductive object configured to create an electrical connection between the first layer and the third layer.

A second embodiment is directed to a method for automating tool touch-off in an additive manufacturing process comprising; providing a substrate comprising a first layer of a first conductive material, applying a second layer onto the first layer, said second layer comprising a binding material, applying a third layer onto the second layer, said third layer comprising a second non-stick conductive material, wherein the second non-stick conductive material comprises a fluoropolymer and carbon nanotubes, and creating an electrical connection between the third layer and the first layer to close a circuit between an additive manufacturing device and the substrate.

A third embodiment is directed to a non-planar substrate for automating tool touch-off in an additive manufacturing process, the substrate comprising a first layer comprising a first conductive material, a second layer comprising a binding material disposed on the first layer, a third layer comprising a second non-stick conductive material disposed on the second layer, wherein the second non-stick conductive material comprises perfluoroalkoxy alkanes and carbon nanotubes, a passage through the third layer and through the second layer and at least partially through the first layer, and a conductive object received within the passage and configured to create an electrical connection between the third layer and the first layer.

Another embodiment is directed to a method for automating tool touch-off in an additive manufacturing process comprising; providing a substrate comprising a first layer of a first conductive material, applying a second layer onto the first layer, said second layer comprising a binding material, applying a third layer onto the second layer, said third layer comprising the second non-stick conductive material, wherein the second non-stick conductive material comprises a fluoropolymer and carbon nanotubes, and creating an electrical connection between the third layer and the first layer to close a circuit between an additive manufacturing device and the substrate, wherein the electrical connection is configured to close a circuit between an additive manufacturing device and the substrate, the method further comprising signaling the additive manufacturing device to decrease a distance between a nozzle of the additive manufacturing device and the substrate, detecting a voltage drop from the nozzle contacting the third layer, setting a reference value associated with the additive manufacturing device to a predetermined value, and signaling the additive manufacturing device to: stop decreasing the distance between the nozzle and the substrate, or to return the nozzle to an original position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
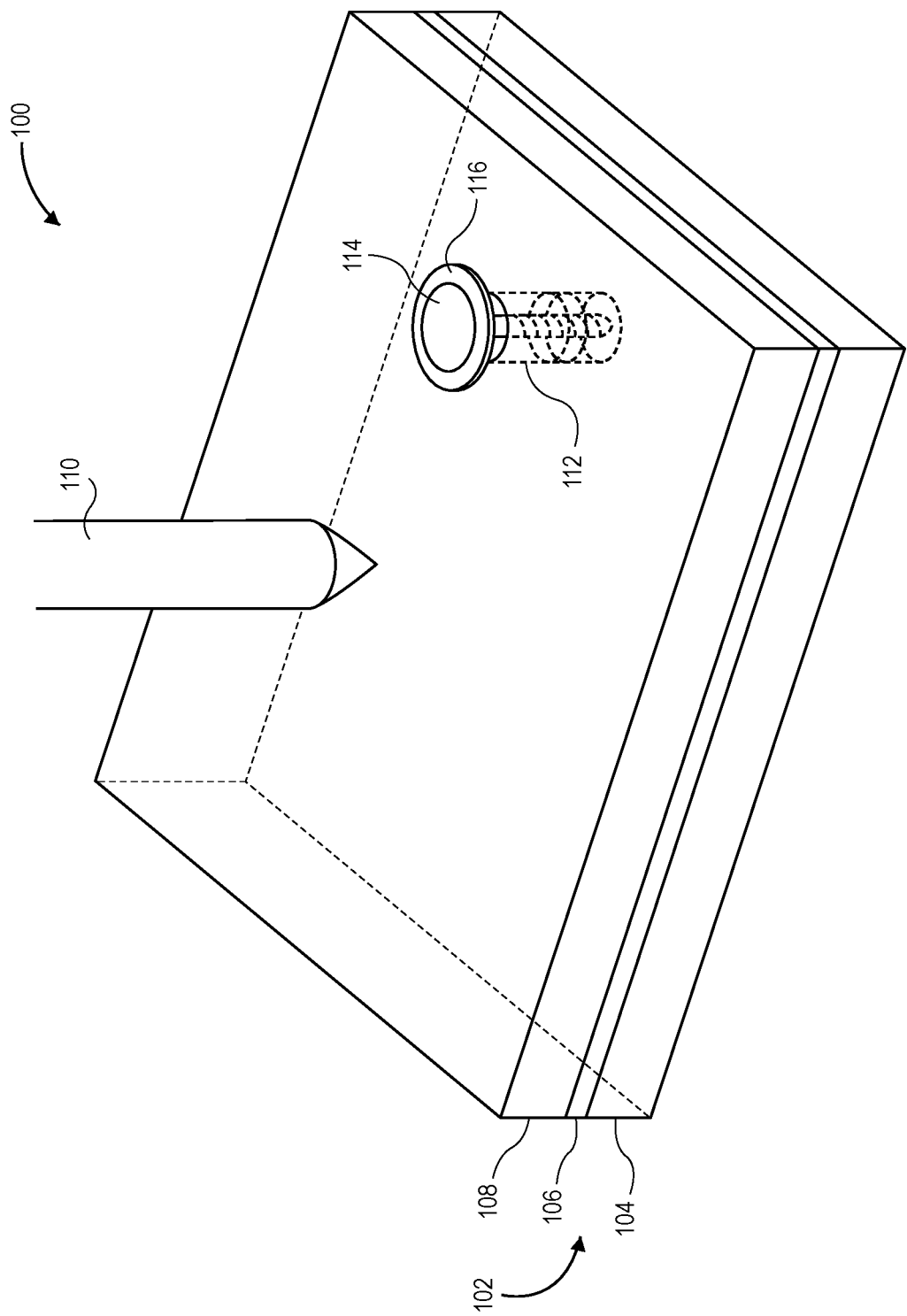
FIG. 1 illustrates a first embodiment of the invention for automating tool touch-off in additive manufacturing processes.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Additive manufacturing, also referred to as 3D printing, is a manufacturing technique in which parts are built up layer by layer by depositing a print material onto a substrate. Generally, Computer-Aided Design (CAD) software is used to create a 3D model of a part to be printed. The CAD model is then converted into G-code using Computer-Aided Manufacturing (CAM) software that generates the tool path for the 3D printer to build the part. The tool path is typically generated by the CAM software "slicing" the CAD model into a plurality of horizontal layers and generating coordinate instructions for printing each of the plurality of horizontal layers. Following the coordinate instructions, the 3D printer then deposits one horizontal layer of the print material, moves the nozzle upwards along the z-axis, deposits the next horizontal layer, and repeats until the part is complete. Because the 3D printer moves based on coordinate instructions, a reference point may need to be set initially. Typically, to set the reference point, a nozzle of the 3D printer is lowered until it contacts the substrate, and this point is then considered to be Z-zero. This process of setting the reference point by zeroing out the z-axis value (and the x-axis and y-axis if necessary) prior to printing is referred to as tool touch-off or tool setting.

Direct ink writing is one type of additive manufacturing process that may benefit from automated tool touch-off. Direct ink writing works by depositing an extruded print material, typically in filament or droplet form, from a nozzle. The print material is then able to retain its shape upon being deposited without needing to be solidified. Direct ink writing allows for a wide variety of print materials, such as polymers, metals, metal alloys, inks, and ceramics, to be printed. Direct ink writing may be used to print directly on a variety of substrates as well, including non-planar substrates using conformal printing techniques.

To automate tool touch-off, the 3D printer may be outfitted with a circuit connecting the nozzle to the substrate. When the nozzle and the substrate make contact, the circuit closes and a resulting voltage drop occurs. A sensor may detect this voltage drop and signal the 3D printer to set Z equal to zero and to stop lowering the nozzle or return the nozzle to the home position. To remedy the above-described deficiencies in current tool-touch off processes, a conductive non-stick material may be applied to the substrate and machined to tight tolerances.

The conductive non-stick material may have myriad other uses outside of automating tool touch-off setting. Industries that deal with particulate accumulation caused by static buildup may benefit from using the conductive non-stick material to dissipate particulate buildup caused by static charges. In environments where high speed machinery is used, the conductive non-stick material may be used to increase detection time of a tool or the like making contact with a surface. In still other cases, the conductive non-stick material may be used to reduce static build-up that may lead to a fire and/or explosive hazard. Alternative embodiments are discussed in more detail below.

FIG. 1 depicts an additive manufacturing device 100 operable to print a part onto substrate 102. Additive manufacturing device 100 may be a direct ink write printer. In other embodiments, additive manufacturing device 100 may be a fused filament fabrication 3D printer. Broadly, additive manufacturing device 100 may comprise any of VAT polymerization, binder jetting, powder bed fusion, sheet lamination, and/or directed energy deposition devices. As depicted, substrate 102 is a flat, planar surface. However, in some embodiments, substrate 102 may be nonplanar or any desired shape. Additive manufacturing device 100 may be configured to conformally print onto substrate 102. In some embodiments, substrate 102 comprises three layers: first conductive layer 104, intermediate binding layer 106, and second non-stick conductive layer 108. In some embodiments, substrate 102 may be arranged such that first conductive layer 104 is a bottom layer, intermediate binding layer 106 is a middle layer, and second non-stick conductive layer 108 is a top layer. In some embodiments, intermediate binding layer 106 may be absent and first conductive layer 104 may be directly connected to second non-stick conductive layer 108.

In some embodiments, first conductive layer 104 may comprise aluminum. In some embodiments, first conductive layer 104 comprises various conductive metals in varying amounts, such as brass, copper, stainless steel, nickel, silver, gold, and/or mixtures thereof. In some embodiments, first conductive layer 104 may comprise a ceramic. Generally, first conductive layer 104 may be any conductive material capable of withstanding the curing process, as will be discussed in more detail below.

In some embodiments, second non-stick conductive layer 108 may comprise a mixture of a non-stick material and a conductive material. In some embodiments, the non-stick material in the second non-stick conductive layer 108 comprises perfluoroalkoxy alkanes (PFA). PFA are a class of fluoropolymers that have excellent anti-stick properties and are often used as liners in chemical processing and heat exchanger applications. PFA, like other anti-stick release agents, is a nonconductive material. In some embodiments, the non-stick material comprises polyvinylfluoride (PVF), polyvinylidene fluoride (PVDF), polytetrafluoroethylene (PTFE), polychlorotrifluorethylene (PCTFE), fluorinated ethylene-propylene (FEP), polyethylenetetrafluoroethylene (ETFE), polyethylenechlorotrifluoroethylene (ECTFE), perfluorinated elastomer [perfluoroelastomer] (FFPM/FFKM), fluoroelastomer [Vinylidene Fluoride based copolymers] (FPM/FKM), fluoroelastomer [tetrafluoroethylene-propylene] (FEPM), perfluoropolyether (PFPE), and/or perfluorosulfonic acid (PFSA), or a combination thereof. In some embodiments, the non-stick material comprises diamond-like carbon. However, repeated use of some non-stick materials, other than PFA, may result in warping and/or a loss of conductivity and/or non-stick properties over time.

In some embodiments, the conductive material in the second non-stick conductive layer 108 comprises carbon nanotubes (CNT). In some embodiments, the conductive material may be a multi-walled CNT having a diameter ranging from about 50 to about 90 nanometers. CNT are small tubes comprising carbon that can provide excellent electrical conductivity. In some embodiments, the conductive material in the second non-stick conductive layer 108 comprises carbon nanofibers. In some embodiments, the second non-stick conductive layer 108 comprises carbon in some form. For example, the second non-stick conductive layer 108 may comprise at least one of carbon nanofibers, carbon black, amorphous carbon, buckminsterfullerenes, carbon nanobuds, or any other carbon allotrope, or any combinations thereof.

By mixing the non-stick material with the conductive material, the conductivity of the conductive material may be imparted into the non-stick material, thus resulting in second non-stick conductive layer 108. In some embodiments, the second non-stick conductive layer 108 comprises a mixture of PFA and CNT. In some embodiments, second non-stick conductive layer 108 comprises a mixture of PFA and about 1.5% CNT by weight. In some embodiments, second non-stick conductive layer 108 comprises a mixture of PFA and about 0.5% CNT to about 2.5% CNT by weight. By decreasing the amount of CNTs in the mixture, the electrical conductivity of the resultant mixture and the second non-stick conductive layer 108 may also decrease.

The second non-stick conductive layer 108 provides excellent release properties while retaining the ability to conduct a charge for automating tool touch-off. The second non-stick conductive layer 108 may not leave any residue on the printed parts, such as is commonly left behind when other currently known release agents are used. Further, the second non-stick conductive layer 108 can withstand repeated curing and printing cycles while adequately maintaining both the anti-stick and conductive properties.

In some embodiments, second non-stick conductive layer 108 may not adhere if applied directly to first conductive layer 104. As such, intermediate binding layer 106 may be applied to substrate 102 before applying second non-stick conductive layer 108. In some embodiments, binding layer 106 comprises a primer. In some embodiments, binding layer 106 may be an insulating material and may prevent electrons from flowing, thereby preventing the circuit from closing upon the nozzle contacting substrate 102. In some embodiments, intermediate binding layer 106 may comprise an insulating paint, or any primer capable of bonding to second non-stick conductive layer 108 such as, for example, cyanoacrylate. As such, once second non-stick conductive layer 108 is applied to intermediate binding layer 106, an electrical connection between first conductive layer 104 and second non-stick conductive layer 108 may be created. In some embodiments, passage or hole 112 may extend entirely through second non-stick conductive layer 108, entirely through intermediate binding layer 106, and at least partially into first conductive layer 104. Once hole 112 is created, conductive object 114 may be inserted therein, thereby creating an electrical connection to carry a charge between second non-stick conductive layer 108 and the first conductive layer 104. In some embodiments, and as depicted in FIG. 1, conductive object 114 comprises a mechanical connector, such as a screw, a nail, a bolt, a wire, a metal shaft, or a plug, and an optional electrical contact 116. Generally, conductive object 114 may comprise any conductive object or device. In some embodiments, electrical contact 116 comprises a washer. In some embodiments, electrical contact 116 may comprise any form that allows for completion of the circuit. In some embodiments, the conductive object 114 may form an electrical contact itself.

In some embodiments, the size of conductive object 114 and/or the number of conductive objects 114 present may be varied. For use cases where the response time between contacting substrate 102 and detecting the voltage drop is important, increasing either or both of the size of conductive object 114 and the number of conductive objects 114 may be useful. When either of the size of conductive object 114 or the number of conductive objects 114 are increased, the amount of time for the electrons to pass from nozzle 110 to substrate 102 may be reduced, leading to an overall reduction in the time to detect the voltage drop and respond accordingly. In some embodiments, increasing the conductivity provided by conductive object 114, may allow for the amount of conductive material, such as CNT, in the second non-stick conductive layer 108 to be decreased. Because the amount of conductive material has a direct impact on the conductivity, increasing the conductivity of substrate 102 through modifying conductive object 114 may allow for less conductive material to be added to the second non-stick conductive layer 108.

In some embodiments, intermediate binding layer 106 is disposed on top of first conductive layer 104 and beneath second non-stick conductive layer 108. In one embodiment, binding layer 106 comprises a primer. Binding layer 106 may provide a better surface for second non-stick conductive layer 108 to adhere than first conductive layer 104. Intermediate binding layer 106 may comprise any material that both allows second non-stick conductive layer 108 to adhere and can withstand the curing process.

To facilitate the automated tool touch-off setting, second non-stick conductive layer 108 may be applied to substrate 102. Second non-stick conductive layer 108 may be applied on top of intermediate binding layer 106 such that second non-stick conductive layer 108 becomes the top layer of substrate 102. In some embodiments, second non-stick conductive layer 108 comprises a combination of PFA and CNT. By mixing the CNT into the PFA, the CNT imparts electrical conductivity whilst the PFA provides anti-stick properties. Further, the specific PFA-CNT mixture may withstand repeated cycles without a degradation in its conductivity or anti-stick properties.

In some embodiments, second non-stick conductive layer 108 is produced by mixing or blending the non-stick material, such as PFA, and the conductive material, such as CNT. A mixer, such as an industrial mixer, may be utilized. Once mixed, second non-stick conductive layer 108 may be powder coated onto intermediate binding layer 106. In some embodiments, second non-stick conductive layer 108 may be applied using a standard powder coating process wherein second non-stick conductive layer 108 is loaded into a powder coating gun and sprayed onto a surface. When second non-stick conductive layer 108 is sprayed, the particles of the second non-stick conductive layer 108 may be negatively charged such that they adhere to positively charged intermediate binding layer 106. In some embodiments, the charges may be reversed for coating. In embodiments, substrate 102 may be electrically grounded during the powder coating process. Additional coats or applications of second non-stick conductive layer 108 may be added to reach the desired total thickness of second non-stick conductive layer 108.

For embodiments where substrate 102 is used with tight tolerances, some additional steps may be taken before, during, and/or after applying each layer of substrate 102. To ensure the requisite tolerances are met, first conductive layer 104 may first undergo an initial pre-machining operation before any additional layers are added. In some embodiments, first conductive layer 104 may be machined below the lower limit of the tolerance range to accommodate the additional layers that may be added. For embodiments in which a tight tolerance substrate 102 is required, second non-stick conductive layer 108 may be machined on a CNC (Computer Numeric Control) lathe or CNC mill that is equipped with a single point diamond insert. Single point diamond inserts are often used to machine optical parts such as lenses. By using the single point diamond inserts on second non-stick conductive layer 108, a tolerance of ±15 microns may be achieved. If the tolerance required is less restrictive, second non-stick conductive layer 108 may be machined using standard tool bits such as carbide and the like.

Next, in some embodiments, intermediate binding layer 106 may be applied to the machined first conductive layer 104. Intermediate binding layer 106 may be applied using any standard technique, such as with a paint brush, sprayed on, or any other typical method of application. After intermediate binding layer 106 is applied, second non-stick conductive layer 108 may be sprayed on to intermediate binding layer 106, as described above.

In some embodiments, the amount of second non-stick conductive layer 108 added may push substrate 102 over the upper limit of the tolerance range, such that substrate 102 may require machining to the final operational dimensions. Once second non-stick conductive layer 108 has been applied to substrate 102, second non-stick conductive layer 108 may be machined to bring substrate 102 to the required dimensions. In some embodiments, second non-stick conductive layer 108 may be machined using a high-precision CNC machine. In some embodiments, the CNC machine may be a CNC-lathe equipped with a single point diamond lathe insert operable to machine the second non-stick conductive layer 108 down to about 15 microns. In some embodiments, the tolerance may be lower than 15 microns.

As an illustrative example, substrate 102 may have a customer-required final thickness of about 2 mm with a tolerance of ±30 microns. First conductive layer 104 may initially be about 3 mm thick. As such, first conductive layer 104, may be machined to a thickness of about 1.95 mm thick. Then, an approximately 0.1 mm (i.e., 100 microns) thick coating of intermediate binding layer 106 may be applied to bring substrate 102 to a thickness of about 2.05 mm. Next, second non-stick conductive layer 108 may be coated onto substrate 102 at thickness of about 0.05 mm. At this point, substrate 102 is about 2.1 mm thick and about 70 microns outside of the customer-required tolerance of ±30 microns. As such, second non-stick conductive layer 108 may then be machined down such that substrate 102 is within the ±30-micron range. To accomplish the tight-tolerance machining, a CNC-lathe or mill may be equipped with a single point diamond insert to machine second non-stick conductive layer 108.

As described above, to automate the tool touch-off process, nozzle 110 may be lowered until nozzle 110 contacts the top surface of substrate 102, thus closing a circuit. In some embodiments, substrate 102 and nozzle 110 may be part of the same circuit such that when nozzle 110 and substrate 102 make contact, current flows from nozzle 110 through substrate 102, thus completing the circuit and causing a voltage drop. This voltage drop may be detected and cause a signal to be sent to additive manufacturing device 100 indicating that the z-axis coordinate position of nozzle 110 should be set to be zero. However, intermediate binding layer 106 may inhibit electrons from flowing through each layer of substrate 102. As such, hole 112 may be created partially or entirely through substrate 102 to facilitate an electrical connection. More specifically, a hole 112 may be created through second non-stick conductive layer 108, through intermediate binding layer 106, and at least partially into first conductive layer 104. In some embodiments, hole 112 is created in substrate 102 in a location that will not interfere with the printing process. A conductive object 114 may be inserted into hole 112, such that conductive object 114 is in contact with first conductive layer 104 and second non-stick conductive layer 108. In some embodiments, and as depicted in FIG. 1, conductive object 114 may be a mechanical connector such as, for example, a screw. In some such embodiments, conductive object 114 may comprise stainless steel or tool steel. Generally, conductive object 114 may comprise any conductive material, such as metal. Conductive object 114 may comprise an optional attached or otherwise associated electrical contact 116 to increase the conductance of substrate 102. In some embodiments, and as depicted in FIG. 1, electrical contact 116 may be a washer. The washer may provide increased surface area to increase the area of conductance for substrate 102. Electrical contact 116 may comprise a conductive material such as copper, aluminum, or the like. When additive manufacturing device 100 is printing conformally, conductive object 114 and/or electrical contact 116 may be modified to conform to a non-planar surface. For example, if a washer is used as electrical contact 116, the washer may be curved such that the entire bottom surface of the washer is in contact with second non-stick conductive layer 108.

In some embodiments, multiple holes 112, conductive objects 114, and/or electrical contacts 116 may be used. For example, if the surface area of substrate 102 increases, it may be necessary to increase the surface area of electrical contact 116 to increase the area of conductivity and ensure electrons flow from nozzle 110 through substrate 102 to cause the voltage drop. In some embodiments, this may be done by providing additional holes 112 having conductive objects 114 and electrical contacts 116. In some embodiments, the size of electrical contact 116 and/or conductive object 114 may be increased to increase the area of conductance. In some embodiments, conductive objects 114 may be electrical contacts 116. In some embodiments, conductive object 114 and/or electrical contacts 116 may comprise a wire connected to first conductive layer 104 and to second non-stick conductive layer 108. In embodiments where a wire is used as the conductive object and/or electrical contact 116, the wire may extend through holes 112 or around the exterior of substrate 102 (such that holes 112 are not necessary).

Figure 2A:
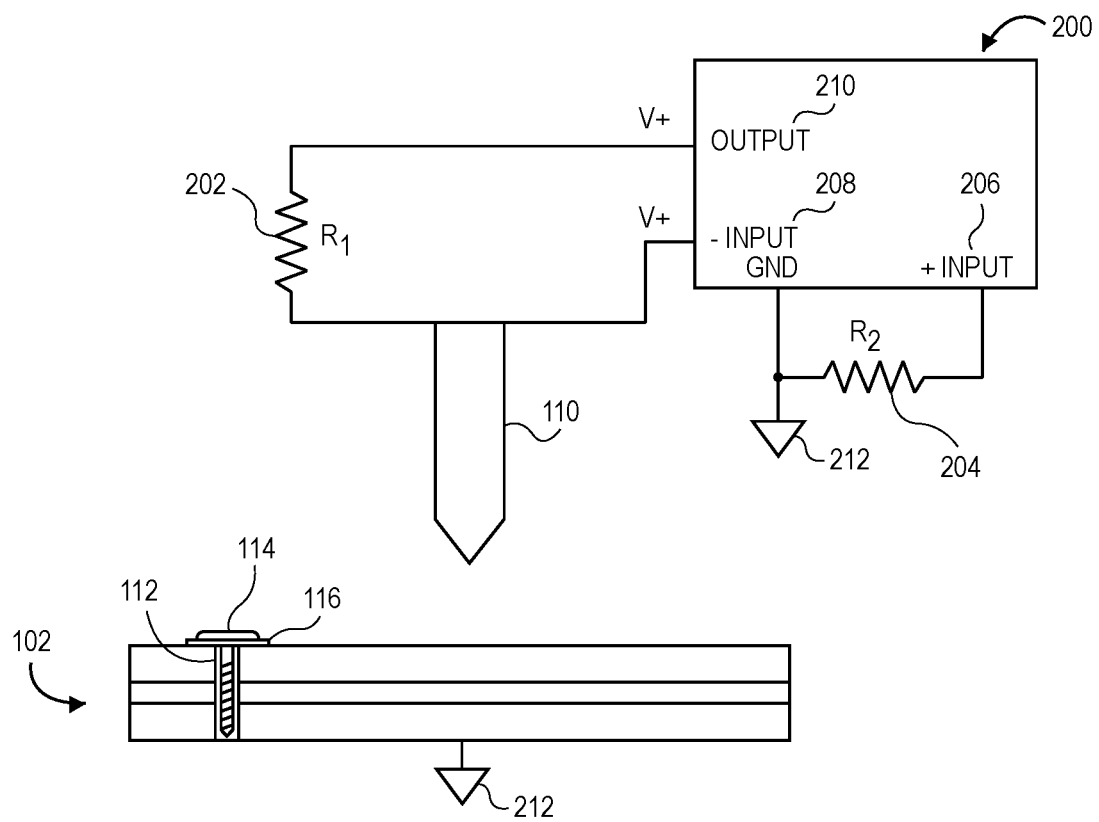
FIG. 2A depicts a circuit in an open configuration for automating tool touch-off.
Figure 2B:
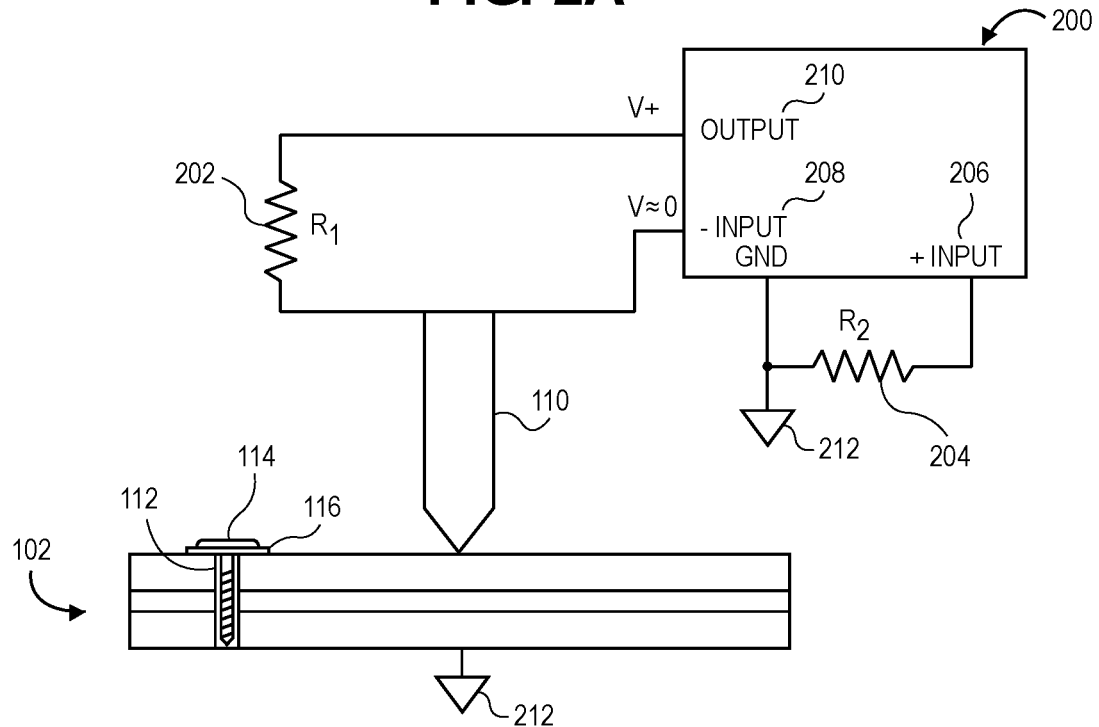
FIG. 2B depicts a circuit in a closed configuration for automating tool touch-off.

FIGS. 2A and 2B depict additive manufacturing device 100 comprising circuit 200 in an open state (FIG. 2A) and a closed state (FIG. 2B) for performing the automated tool touch-off, respectively. As described above, tool touch-off is sometimes performed prior to printing a part. For example, in some manufacturing environments, tool touch-off may be performed once every day, once every shift, or repeatedly over any desired time period to ensure additive manufacturing device 100 is correctly calibrated. Tool touch-off may also be performed if a part is being printed onto another part. Tool touch-off may be performed to provide additive manufacturing device 100 with the correct frame of reference for printing parts.

For example, when additive manufacturing device 100 is initially powered on, nozzle 110 may be in a "home" position that is a particular distance away from substrate 102. Additive manufacturing device 100 may be configured such that the home position is the origin of the coordinate system (i.e., x=0, y=0, and z=0). Thus, as nozzle 110 moves downward along the z-axis from the home position, the z-axis value will become increasingly negative. When printing parts, the G-code generated for the parts may assume the part is starting from z=0. Therefore, if the origin of the coordinate system was left unchanged, the part would be printed in mid-air. Consequently, additive manufacturing device 100 may need to reset the origin of the coordinate system to the top of substrate 102 such that parts are built beginning on the top surface of substrate 102.

To automate the tool touch-off process, a circuit, such as circuit 200, may be used with additive manufacturing device 100. Circuit 200 may be open when nozzle 110 is not in contact with substrate 102 as in FIG. 2A, and circuit 200 may be closed when nozzle 110 contacts substrate 102 as in FIG. 2B. When nozzle 110 contacts substrate 102, a voltage drop occurs. Additive manufacturing device 100 uses the detection of the voltage drop to determine if the value of the z-axis should be set to zero. As depicted, circuit 200 is connected to nozzle 110 and comprises first resistor 202, second resistor 204, positive input pin 206, negative input pin 208, output pin 210, and ground 212. In some embodiments, first resistor 202 may have a higher resistance value than second resistor 204. Prior to connecting nozzle 110 with substrate 102, output pin 210 may have a set voltage as shown in FIG. 2A. Because circuit 200 is in an open state at this point, there is no electrical connection between nozzle 110 and substrate 102 and no current flows through circuit 200. As such, there may be no voltage drop across circuit 200 and, therefore, positive input pin 206 may have the same set voltage as output pin 210.

In embodiments, when nozzle 110 contacts substrate 102 as depicted in FIG. 2B, output pin 210 is shorted to ground, resulting in the voltage drop. Current may now flow through circuit 200. Positive input pin 206 may see substantially zero voltage when the voltage drop occurs. In embodiments, the voltage drop may be detected by a sensor and transmitted to additive manufacturing device 100. In some embodiments, additive manufacturing device 100 may comprise a sensor, such as a voltmeter, to detect the voltage drop. Once additive manufacturing device 100 receives the signal, Z-zero may be set. In some embodiments, additive manufacturing device 100 may have a computer program stored thereon to automate this process. Circuit 200 may further comprise a computer comprising one or more non-transitory computer-readable media storing computer-executable instructions, that when executed by one or more processors, perform the automated tool touch-off process as described herein.

Figure 3:
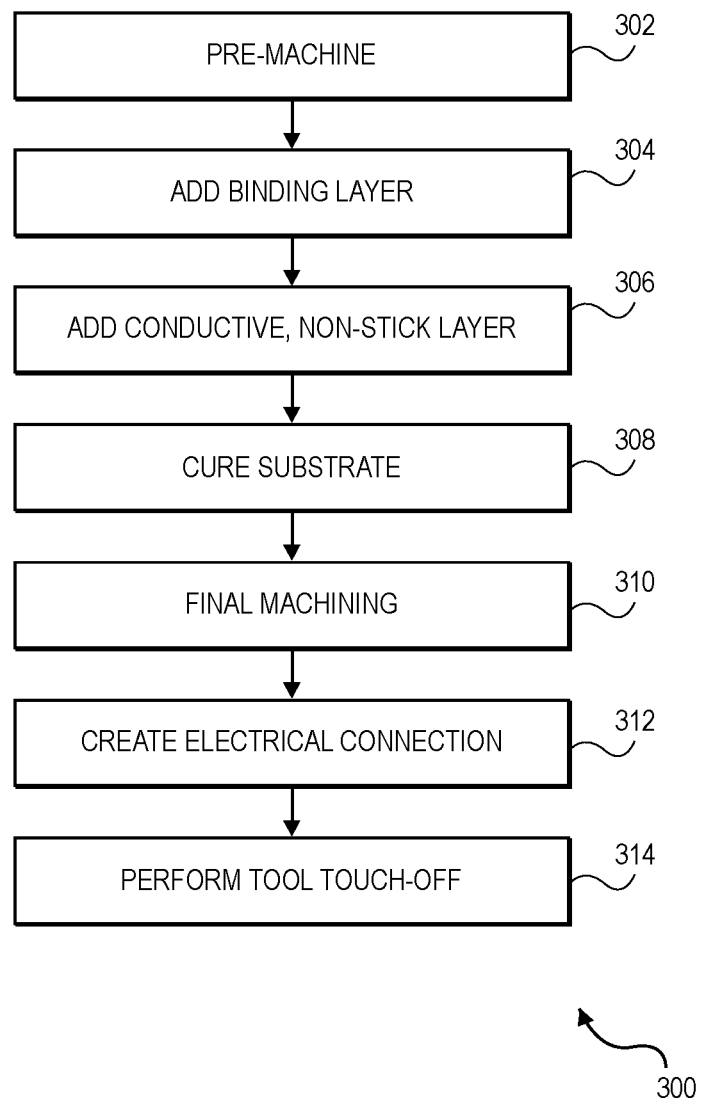
FIG. 3 depicts an exemplary flow chart presenting a process of the invention for automating tool touch-off in additive manufacturing processes.

FIG. 3 depicts an exemplary method 300 for automating tool touch-off in an additive manufacturing process. Beginning at step 302, first conductive layer 104 of substrate 102 may undergo a pre-machining process. As described above, the pre-machining may reduce the thickness of substrate 102 to beneath a desired value such that the total final thickness and surface of substrate 102 is within tolerance for the desired use case. For example, if substrate 102 is to be about 5 mm thick, the pre-machining may machine first conductive layer 104 to about 4 mm. In some embodiments, first conductive layer 104 may be machined using a lathe or a mill. Once first conductive layer 104 is machined to the desired dimensions, intermediate binding layer 106 may be applied at step 304. Intermediate binding layer 106 may comprise a primer that allows for second non-stick conductive layer 108 to adhere thereto. Intermediate binding layer 106 may be applied by various known techniques, such as by painting or spraying.

In some embodiments, after intermediate binding layer 106 is applied, the second non-stick conductive layer 108 may be applied at step 306. Second non-stick conductive layer 108 may be applied by a powder coating process on substrate 102. In some embodiments, before applying second non-stick conductive layer 108, the components of the second non-stick conductive layer 108 may be mixed. The mixing of the non-stick material and the conductive material may take place using a standard mixing process, as described above. An industrial mixer may be used to mix the non-stick material, such as PFA, with the conductive material, such as CNT. Broadly, any applicable mixing technique may be used to mix the non-stick material with the conductive material. In some embodiments, when mixing the materials, a balancing act may be required to obtain a conductive, non-stick surface having the desired properties. If too much conductive material is added, the resultant mixture may become difficult to spray and hinder the application to the substrate 102 using a conventional powder coating process. In some embodiments, second non-stick conductive layer 108 may be electrostatically coated onto substrate 102. If not enough conductive material is added, the requisite conductivity may not be imparted to the second non-stick conductive layer 108 to generate the voltage drop. In some embodiments, the second non-stick conductive layer 108 comprises PFA and 1.5% CNT by weight. However, as the amount of conductive material increases, the evenness of the distribution of the conductive material within the non-stick material may decrease. Once the non-stick material and the conductive material are mixed, the mixture may be applied onto intermediate binding layer 106. In some embodiments, second non-stick conductive layer 108 has a thickness of at least about 50 microns. Broadly, the thickness of second non-stick conductive layer 108 should elevate substrate 102 above the tolerance range such that second non-stick conductive layer 108 may then be precisely machined down to the desired value.

Next, at step 308, substrate 102 may be cured. In some embodiments, once second non-stick conductive layer 108 is applied, such as via powder coating, second non-stick conductive layer 108 may need to be cured, such as in an oven, to increase the durability of the powder coat. Curing substrate 102 may also improve the adherence of second non-stick conductive layer 108 to intermediate binding layer 106. In some embodiments, substrate 102 is cured at about 720° F. In some embodiments, substrate 102 is cured at about 600-800° F. As such, it may be necessary that the materials comprising first conductive layer 104 and intermediate binding layer 106 can also withstand the curing temperature. In some embodiments, substrate 102 may be cured for at least about 20 minutes. In some embodiments, substrate 102 may be cured for about 10-30 minutes. After substrate 102 is cured, substrate 102 may be cooled to room temperature before performing further operations.

At step 310, second non-stick conductive layer 108 may undergo a final machining process. In some embodiments, second non-stick conductive layer 108 may be machined to a tolerance of ±15 microns. In some embodiments, second non-stick conductive layer 108 may be machined using a lathe, such as one having a single point diamond lathe insert attached. The single point diamond lathe insert may allow for the tight tolerance to be achieved.

After second non-stick conductive layer 108 has been machined to its final dimensions, an electrical connection between first conductive layer 104 and second non-stick conductive layer 108 may be created at step 312. As described above, due to the introduction of intermediate binding layer 106, substrate 102 may not be entirely conductive throughout. As such, an electrical connection between the two conductive layers, first conductive layer 104 and second non-stick conductive layer 108 of substrate 102 may need to be created to bypass any insulation from intermediate binding layer 106. In some embodiments, this may be accomplished by forming hole 112, such as by drilling, entirely through second non-stick conductive layer 108, entirely through intermediate binding layer 106, and at least partially into first conductive layer 104. Thereafter, conductive object 114 and electrical contact 116 may be disposed within and/or on top of hole 112.

In some embodiments, conductive object 114 may provide an electrical connection between first conductive layer 104 and second non-stick conductive layer 108. By creating the electrical connection, circuit 200 may become closed upon nozzle 110 contact substrate 102. In some embodiments, electrical contact 116 increases the area of conductance of substrate 102, thereby improving the rate at which electrons will travel from nozzle 110 through substrate 102, thus causing the requisite voltage drop for automated touch-off. If more electrical connections are created within substrate 102, the rate at which the voltage drop occurs and the rate at which the voltage drop is detected may increase. In some embodiments, the rate at which the voltage drop is detected may increase the efficiency and/or accuracy of the operation. By increasing the rate at which the voltage drop is detected, a computer controlling the operation may respond faster to the voltage drop. This may be useful to prevent tool crashing for operations in which a tool touches a surface and then performs an operation in response to touching the surface. When a non-metal conductive substrate 102 is used, it may be desirable to replace the conductive object 114 and electrical contact 116 with a different method for creating an electrical connection. In some embodiments, electrical lead lines may be used to create an electrical connection through substrate 102.

After step 312 is completed, the automated tool touch-off may begin at step 314. In some embodiments, step 314 is initiated by an operator controlling additive manufacturing device 100. In some embodiments, the operator may utilize a user interface on a screen of additive manufacturing device 100 or on a remote computer that is communicatively coupled to and controlling additive manufacturing device 100. The tool touch-off process may begin with nozzle 110 being lowered towards substrate 102. As nozzle 110 is lowered, a sensor (not shown) may continuously measure voltage in circuit 200 to detect the voltage drop. Once nozzle 110 and substrate 102 make contact, circuit 200 may be closed (as in FIG. 2B) and a voltage drop may occur. In response to the voltage drop, the sensor may transmit a signal to the computer indicative of the voltage drop. Upon receiving the signal, additive manufacturing device 100 may set the value of the z-axis to a reference value. The reference value may be predetermined such that it is automatically set when the voltage drop is detected.

In some embodiments, the tool touch-off process may be fully automated. In some embodiments, the operator may set the reference value for an automated process. In some embodiments, the reference value is zero. In some embodiments, the tool touch-off process may set the x-axis and y-axis to a reference value. As such, additive manufacturing device 100 may print a part having an origin on substrate 102. Additionally, or alternatively, upon receiving the signal, the computer may instruct additive manufacturing device 100 to cease moving nozzle 110 to prevent a potential crash. In some embodiments, additive manufacturing device 100 may return nozzle 110 to an original position or an otherwise predetermined position.

The non-stick conductive mixture, such as PFA-CNT, may be used in various other applications. Generally, any environment in which conductivity and/or low friction are desired may benefit from the non-stick conductive mixture. It will be appreciated that the surfaces to which the non-stick conductive mixture may be applied in the below-described example use cases may differ from substrate 102 described above. For example, first conductive layer 104 may not be needed for embodiments where a circuit is not being closed. In some embodiments, the substrates may only need intermediate binding layer 106 to allow second non-stick conductive layer 108 to adhere.

Figure 4:
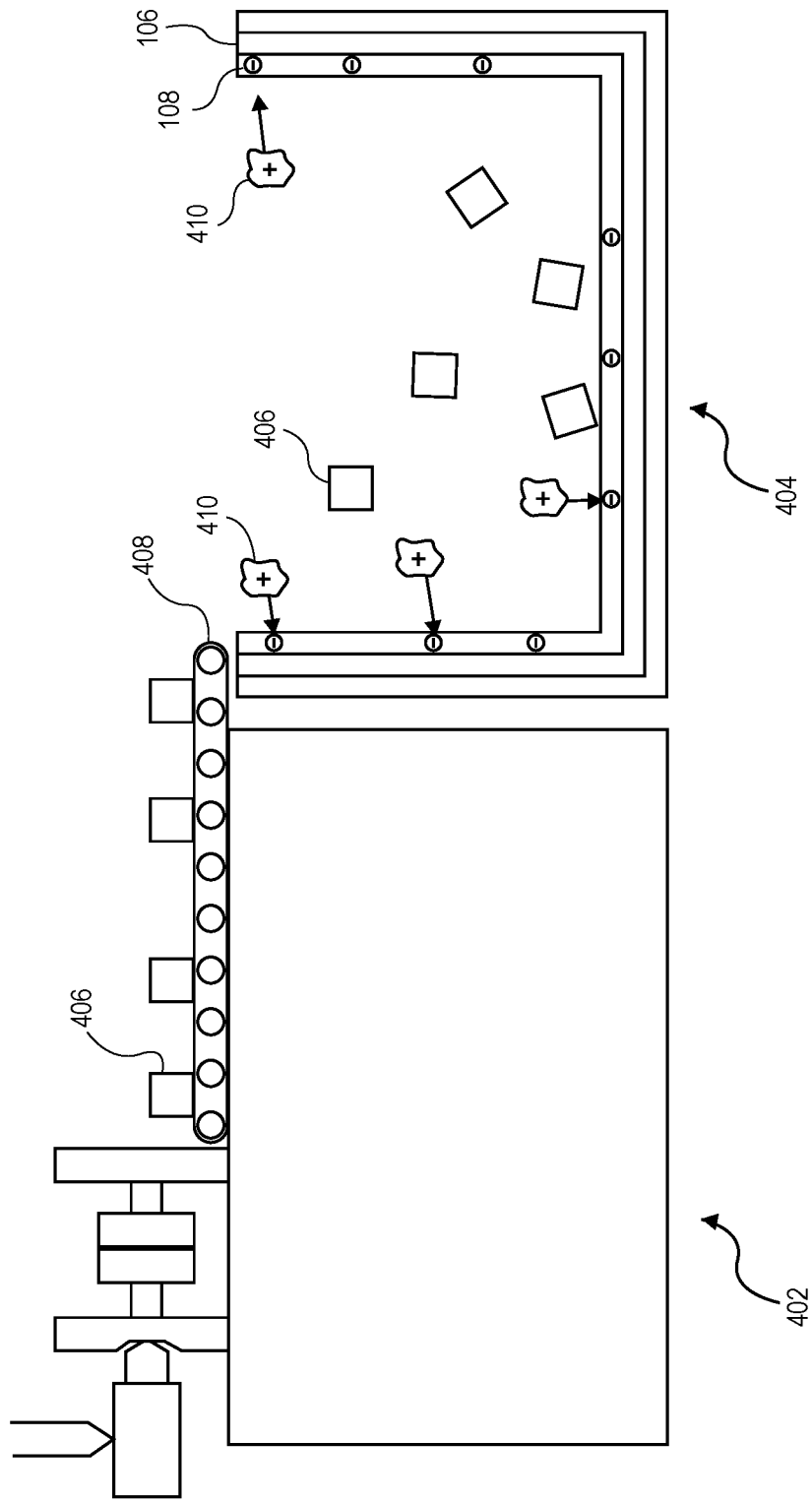
FIG. 4 depicts a second embodiment of the invention in an injection molding environment.

With reference to FIG. 4, a second embodiment of the non-stick conductive mixture is shown. In the plastics industry, static electricity buildup is a common problem and can lead to dust and particulate accumulation, quality issues, and shock hazards for workers. Static buildup may be caused due to the triboelectric effect in which a material may become electrically charged after separating from a different material. The non-stick conductive mixture may be used as an anti-static agent.

As a first example, the non-stick conductive mixture, such as PFA-CNT, may be utilized in an injection molding process, as depicted in FIG. 4. FIG. 4 illustrates a simplified injection molding process comprising injection molding machine 402, collection bucket 404, parts 406, and conveyor 408. In injection molding, parts 406 may be dropped into collection bucket 404 after they have been molded. Often, when the parts 406 fall into collection bucket 404, static buildup occurs. When a large number of parts are injection molded and subsequently deposited into collection bucket 404, the static from parts 406 may accumulate and a large static field may be generated. As such, dust 410 and other particulates may be attracted to the molded parts resulting in unclean parts and potential shock hazards. Static buildup can also lead to parts 406 sticking together resulting in sorting difficulties.

In some embodiments, by lining collection bucket 404 with second non-stick conductive layer 108, these deficiencies may be remedied. The conductive nature of the second non-stick conductive layer 108 may attract the dust and other particulates, while the non-stick nature may prevent parts 406 from adhering to the surface of collection bucket 404. As depicted, second non-stick conductive layer 108 may be negatively charged while dust 410 may be positively charged, such that second non-stick conductive layer 108 attracts dust 410. Other sections of the injection molding process may also benefit from a non-stick conductive coating. For example, the thermoplastic pellets may experience static buildup before they are molded. The non-stick conductive mixture, such as PFA-CNT, may be added to the pellets as an additive to impart conductivity. Additionally, or alternatively, the non-stick conductive mixture may be used to line the inside of other containers and/or passageways, such as a surge bin, through which the pellets pass or are stored to mitigate static buildup.

As another example, transport systems, such as pneumatic tubes, may also experience static buildup caused by parts passing through the pneumatic tubes and contacting the tubes and other parts. In some cases, pneumatic tubes are used to transport materials that may pose an explosive hazard. If the materials are subject to an electrostatic discharge, an explosion may result. In some embodiments, lining the walls of the pneumatic tubes with the non-stick conductive mixture may aid in reducing static buildup and any potential explosion risks.

Likewise, transport systems that transport materials and parts via pipes may experience unwanted static buildup that can lead to inefficiencies in the transport process. Similarly, by lining the inside walls of the pipe with the non-stick conductive mixture, dust and other particulates may be attracted to the pipe walls while not interfering with the transport due to the non-stick nature of the non-stick conductive mixture. Other transport systems, such as chutes and conveyor belts may also benefit from lining any side walls with the non-stick conductive mixture.

Still other production environments may benefit from using the non-stick conductive mixture to aid in reducing static buildup. For example, the powder processing industry must deal with potential problems caused by static buildup. Static buildup can occur in various processing steps including, sieving, pouring, grinding, micronizing, and transfer. Incorporating the non-stick conductive mixture into any of these steps may aid in reducing the amount of static generated. As described above, environments in which electrostatic buildup may lead to a fire and/or explosive hazard, the non-stick conductive mixture may be used to mitigate that risk. For example, in explosives handling, the buildup of static may cause a fuse to light or the explosive to otherwise ignite. The non-stick conductive mixture may be used to ensure no electrostatic charge builds up and may be used together with other preventative measures such as working with the explosive material in a grounded area.

Similar to the use with automated tool touch-off setting, the non-stick conductive mixture may be used to increase the detection time of an object or tool making contact with a surface or another object that results in a voltage drop. For example, in a manufacturing environment, a tool may be configured to perform an operation where the operation causes the tool to touch a surface contact resulting in a circuit closing and a subsequent voltage drop. By applying the non-stick conductive mixture to the surface, the time for the voltage drop to occur may decrease and the efficiency of the operation and the system may increase.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A system for automating tool touch-off in an additive manufacturing process, the system comprising:
    a substrate, comprising:
        a bottom layer comprising a conductive material;
        a middle layer disposed directly on the bottom layer, the middle layer comprising a binding material; and
        a top layer disposed on the middle layer, the top layer comprising a non-stick conductive material,
        wherein the non-stick conductive material comprises a fluoropolymer and carbon nanotubes, and
        wherein print material is configured to be deposited onto the top layer; and
    at least one conductive object extending through the top layer, the middle layer, and at least partially into the bottom layer, the at least one conductive object providing an electrical connection between the bottom layer and the top layer; and
    a circuit comprising the substrate and a nozzle of an additive manufacturing device,
    wherein the circuit is configured to close when the nozzle contacts the top layer of the substrate and the electrical connection is created between the top layer and the bottom layer by current passing from the top layer, through the at least one conductive object and to the bottom layer.

2. The system of claim 1, further comprising:
    at least one non-transitory computer-readable media comprising computer-executable instructions that, when executed by at least one processor, cause the at least one processor to perform a method of automating tool touch-off in the additive manufacturing process, the method comprising:
        causing the additive manufacturing device to decrease a distance between the nozzle of the additive manufacturing device and the substrate;
        determining a voltage drop resulting from the nozzle coming into contact with the top layer of the substrate; and
        responsive to determining the voltage drop, setting a reference value associated with a coordinate system of the additive manufacturing device, wherein the reference value corresponds to a position of the nozzle upon determining the voltage drop.

3. The system of claim 1, wherein the fluoropolymer comprises perfluoroalkoxy alkanes.

4. The system of claim 1, wherein the at least one conductive object comprises a mechanical connector.

5. The system of claim 1, wherein the at least one conductive object comprises at least one of: a screw, a bolt, a nail, a shaft, a plug, or a wire.

6. The system of claim 1, wherein the at least one conductive object comprises an electrical contact disposed upon the top layer.

7. The system of claim 1, wherein a concentration of the carbon nanotubes in the non-stick conductive material is from 0.5% to 2.5% by weight.

8. The system of claim 1, wherein the substrate is non-planar.

9. The system of claim 1, further comprising a sensor operably coupled to the circuit, the sensor configured to detect a voltage drop when the circuit closes.

10. The system of claim 1, wherein the top layer is disposed directly on the middle layer.

11. A method of automating tool touch-off in an additive manufacturing process, the method comprising:
    causing an additive manufacturing device to decrease a distance between a nozzle of the additive manufacturing device and a substrate,
    wherein the substrate comprises:
        a bottom layer comprising a conductive material;
        a middle layer disposed directly on the bottom layer, the middle layer comprising a binding material; and
        a top layer disposed on the middle layer, the top layer comprising a non-stick conductive material, the non-stick conductive material comprising a fluoropolymer and carbon nanotubes;
    wherein print material is configured to be deposited on the top layer,
    wherein the substrate defines a hole extending at least partially into the bottom layer, through the middle layer, and through the top layer, and
    wherein a conductive object extends through the hole and provides an electrical connection between the bottom layer and the top layer;
    determining a voltage drop resulting from a circuit closing due to the nozzle coming into contact with the top layer of the substrate, thereby creating the electrical connection between the top layer and the bottom layer by current passing from the top layer, through the conductive object and to the bottom layer,
    wherein the circuit comprises the nozzle and the substrate; and
    responsive to determining the voltage drop, setting a reference value associated with a coordinate system of the additive manufacturing device, wherein the reference value corresponds to a position of the nozzle upon determining the voltage drop.

12. The method of claim 11, wherein the fluoropolymer comprises perfluoroalkoxy alkanes.

13. The method of claim 11, wherein the conductive object comprises at least one electrical lead line.

14. The method of claim 11,
    wherein the conductive object comprises a mechanical connector, and wherein the method further comprises:
        inserting the mechanical connector into the hole prior to causing the additive manufacturing device to decrease the distance between the nozzle of the additive manufacturing device and the substrate.

15. The method of claim 11, wherein determining the voltage drop comprises:
    monitoring, with a voltmeter, a voltage of a circuit defined at least in part by the nozzle, the top layer, the conductive object, and the bottom layer, wherein the circuit closes when the nozzle contacts the top layer.

16. The method of claim 11, further comprising:
responsive to determining the voltage drop, causing the additive manufacturing device to stop decreasing the distance between the nozzle and the substrate.

\* \* \* \* \*